May 25, 1937.  J. A. STREUN  2,081,412
COMBINATION HULLER AND FEEDER
Filed Jan. 31, 1935

Inventor
JOHN A. STREUN
Jesse R. Stone
Lester B. Clark
By
Attorney

Patented May 25, 1937

2,081,412

UNITED STATES PATENT OFFICE 2,081,412

COMBINATION HULLER AND FEEDER

John A. Streun, Sherman, Tex., assignor to Hardwicke-Etter Company, Sherman, Tex., a corporation Application January 31, 1935, Serial No. 4,276

7 Claims. (Cl. 19—37)

My invention relates to cotton machines and more particularly to machines for feeding the cotton to the gin and for eliminating the hulls and trash therefrom in the passage of the cotton through the device.

It is an object of the invention to provide an efficient device for handling the cotton before it is fed to the gin and for most effectively eliminating the hulls and trash from the cotton during the passage of the cotton through the machine.

It is a particular object of the invention to provide, in connection with the usual saw cylinder, a re-claiming cylinder which is adapted to deliver lint to the saw cylinder, said re-claiming cylinder operating in combination with a segmental backing member to entirely eliminate the lint from the hulls and chaff which are then passed out of the machine.

Another object of the invention is to provide means adjustable relative to the saw cylinder and the re-claiming cylinder which make it possible to regulate the device for handling different quantities and sizes of cotton balls.

The invention resides in the particular construction and arrangement of the parts making up the device whereby an improved result is obtained.

Figure 1:
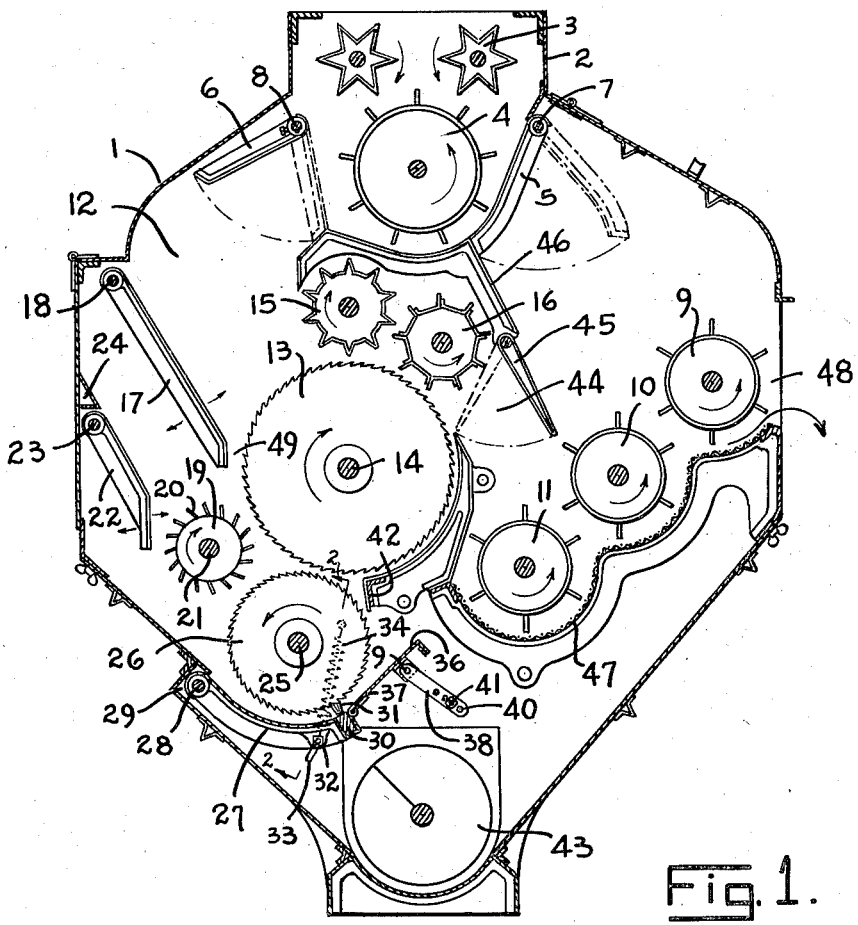

Referring to the drawing herewith wherein the preferred embodiment of the invention is disclosed, Fig. 1 is a side view partly in elevation of a housing having the operating parts therein, one end of the housing being removed and the shafts of the rollers being in section.

Figure 2:
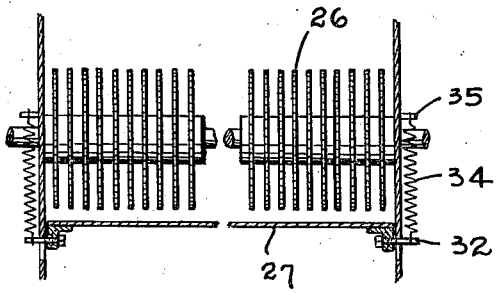

Fig. 2 is a broken detail illustrating the manner in which the segment below the reclaiming saw cylinder may be resiliently mounted.

My invention involves a construction having some features of ordinary construction. There is an outer housing 1, which is shaped to effectively house the operating parts of the device. At the upper portion of the housing 1 is a hopper 2, to which cotton is delivered from the usual conveyer not shown. This hopper houses the feeding elements including two upper fluted rollers 3 adapted to rotate in opposite directions to feed the cotton between the rollers directly downward upon the spiked roller 4, which rotates to move the cotton toward the left in the view shown in the drawing. This construction is old in the art.

The lower portion of the feeding element is provided with valve controlled outlets. There is an opening adapted to be closed by a valve 5 and an opposite opening adapted to be closed by the valve 6. These two valves are mounted upon shafts 7 and 8, respectively, said shafts being rotatable by any desired means to move the valve on the pivots provided by the rods 7 and 8 to open or closed position, as indicated by the dotted lines in the drawing. If the cotton is particularly clean and it is not desired to remove the hulls therefrom, the valve 5 may be opened to discharge the cotton directly downward upon cleaning rollers 9, 10 and 11, respectively. If, however, cotton is to be fed through the huller the valve 5 is closed and the valve 6 is opened to allow the discharge of the cotton into the chamber 12 above the saw cylinder 13.

The saw cylinder 13 is mounted upon a shaft 14 in the usual manner and the teeth on the saws are inclined upwardly on the forward side adjacent the chamber 12 so that when the saw cylinder is rotated in a clock-wise direction as viewed in Fig. 1 the cotton will be carried upwardly toward the stripper roll 15 and the doffer roll 16.

On the forward side of the saw cylinder is an adjustable hull board 17. Said board extends the full length of the cylinder and is supported non-rotatably upon the rod 18, the rotation of which will move the lower end of the board toward or away from the saw cylinder. This board is therefore adjustable so as to provide the required space between the lower end thereof and the saw cylinder to allow the hulls to pass downwardly through said space.

Below the hull board 17 is a knocker roll 19 having projecting spikes 20 thereon inclined rearwardly from the direction of rotation. The said roll is mounted upon a shaft 21 adapted to rotate in a clock-wise direction as seen in the drawing.

Spaced forwardly from the knocker roll and below the upper hull board 17 is a second hull deflector 22. This board is fixed upon the rod 23 secured in the housing and adjustable toward and away from the knocker roll. The lower end of this board is arranged in approximately vertical position and is adapted to be spaced at a point closely adjacent the knocker roll so as to allow hulls to pass between the same.

Above the hull deflector 22 is an inclined surface 24 formed on the inner wall of the housing and adapted to deflect hulls engaging thereon downwardly upon the board 22.

Below the saw cylinder 13 and slightly forwardly therefrom is a rotatable shaft 25 having a re-claiming saw cylinder 26 thereon. Said cylinder rotates in a counterclockwise direction and its teeth are inclined forwardly in the direction of rotation. It will be seen that the peripheral edge of this cylinder is closely adjacent the peripheral edge of the cylinder 13 and the teeth on both cylinders are moving in the same direction at their adjacent edges.

Below the reclaiming cylinder 26 is a concave segment 27 which is preferably made of sheet metal concaved on its inner surface to correspond somewhat with the curvature of the reclaiming cylinder. The segment is secured at one end upon a rod or shaft 28 extending the length of the housing and mounted in a recess 29 below the inclined forward end of the housing. The edge of the segment remote from the pivot rod 28 is formed with a longitudinal block 30 thereon within which are mounted a series of brushes 31, which extend inwardly into contact with the periphery of the reclaiming cylinder. These bristles tend to force the hulls and lint closely against the teeth of the saw.

The edge of the segment having the brushes thereon is intended to move slightly in a direction to and from the reclaiming cylinder. This is accomplished by forming pins 32 at each end of the segment adjacent the brush. Said pins are mounted in lugs upon the frame of the segment and extend through arcuate slots 33 in the side wall of the housing. The segment is held resiliently toward the saw by means of spring 34. Said springs are secured at one end to the pins 35 secured to the wall of the housing above the segment. The lower ends of said springs are secured to the outwardly projecting ends of the pins 32 previously noted. It will be seen that the lower end of the segment is thus adapted to yield outwardly away from the saw when material crowds between the brushes and the saw.

Beyond the segment 27 and inwardly of the housing is a deflecting plate 36, which as will be seen is a longitudinal plate of sheet metal pivoted at 37 to the bar 30 to which the brushes are attached. The other end of the plate is bent laterally and a support is provided for the said plate by means of a link 38. Said link is pivotally connected at 39 to the rearward side of the plate 36 and has at its end remote from the plate a plurality of openings 40 through which may be extended a bolt 41 in any selected one of said openings to support the same in the side wall of the housing, as will be understood from the drawing. It is thus possible to adjust the position of the deflecting plate 37. Further, it will be noted that the support provided for the deflecting plate together with its hinged connection with the edge of the segment 27 allows a yielding movement at the brushes, as has been previously described.

Below the saw cylinder 13 and adjacent the periphery of the reclaiming cylinder is a stripper plate 42, said plate serving to prevent hulls which might adhere to the lint carried around by the reclaiming cylinder from passing upwardly.

Below the deflecting plate is a screw conveyor 43 by means of which hulls and chaff may be removed from the housing. The stripper roll above the saw cylinder 13 is rotated in such a manner as to prevent the passsage of hulls above the saw cylinder. The doffer roll 16 rotates in the opposite direction and serves to help remove the lint from the saw cylinder and force it through the outlet opening 44 to the cleaning rolls 9, 10 and 11 previously noted. The opening or passage 44 may be closed by means of the damper or valve 45 pivoted at its upper end to the plate 46 in the frame of the device. This valve will be closed when the cotton is to be directed through the opening past the door 5 leading from the feeder chamber.

The three rolls 9, 10 and 11 are agitator rolls which move the cotton upwardly along a foraminated screen 47 toward the outlet 48. It will be seen that cotton passing over these rolls and thrown upwardly along the screen will have the dirt sifted therefrom so that when the cotton is discharged through the opening 48 to the gin it will be in relatively clean condition.

It is to be noted that the side walls of the housing 1 are made with numerous doors by which access may be obtained to the interior from various points. Most of these elements of construction are, however, old in the art and need not be particularly described.

In the operation of this device the cotton is delivered to the feeder by which it is passed around to the left and discharged through the opening below the door or valve 6, into the chamber 12. This cotton is mixed with hulls and chaff to some extent and, when it is engaged by the saw cylinder, the teeth will engage the lint and carry it around the upper side of the saw cylinder toward the doffer roll 16. Any hulls adhering to the cotton lint thus carried around will be engaged by the radial vanes upon the stripper roll 15 and thrown back into the chamber 12 and against the deflecting plate 17. These hulls will drop downwardly to pass through the opening between the lower end of the plate 17 and the saw cylinder. If there is lint still left upon the hulls thus tending to pass through this space the lint will be engaged by the teeth of the saw and torn away from the hulls which may pass downwardly through the opening 49.

Cotton passing through the said opening 49 will be received upon the roll 19 which will tend to throw the hulls, upon which there may be some remaining lint, again toward the saw cylinder 13. The rotation of the saw will throw the hulls from the same and into the space between the two plates 17 and 22. The lint will be engaged by the saw cylinder and carried around to the doffer roll. The hulls which are thrown away from the saw may pass downwardly toward the roll 19 by which they may be again delivered toward the saw cylinder. However, most of the hulls will pass downwardly through the space between the roll 19 and the deflecting plate 22 and will be engaged by the reclaiming cylinder 26.

The hulls engaged by the reclaiming cylinder will be carried around between same and the segment 27. It will be obvious that any lint still remainng in the hulls will be torn therefrom and carried away by the teeth of the reclaiming cylinder, the brushes 31 acting to force the hulls into close contact with the teeth of the reclaiming saw. The cotton lint thus engaged will be carried upwardly to the rearward side of the reclaiming cylinder and delivered to the cylinder 13. These two cylinders are closely adjacent. The saw cylinder 13, because of its greater diameter, will have a greater peripheral speed and will remove the lint from the reclaiming cylinder and carry it around to the doffer roll 16.

The hulls passing the brushes 31 will be thrown over the plate 37 and fall upon the conveyer 43 to be passed out of the housing.

The cotton lint removed from the saw cylinder 13 by the doffer roll 16 will fall upon the agitator rolls 9, 10 and 11 and pass out of the housing.

By passing the cotton through the machine in the manner thus described it is possible to assure the cleaning of the cotton lint from the hulls so that the hulls may be discharged without carrying any material portion of the lint therewith. The resilient segment 27 with the brushes thereon is of material importance in accomplishing this result. The hulls are held closely against the reclaiming cylinder by this segment but the resiliency of the mounting of the segment 27 allows large pieces of hulls or other material to pass without damaging the saw or the machine. I am thus enabled to entirely eliminate the lint from the hulls before they are discharged without danger of clogging the machine or injury to the parts. Furthermore the manner in which the deflecting plate 37 is adjustably and flexibly mounted is of material value when taken in combination with the resilient segment 27.

It will be obvious that certain changes and modifications of the device may be made without departing from the spirit of the invention which has been disclosed.

What is claimed as new is:

1. A cotton huller including a housing, a saw cylinder rotatable therein, means to feed seed cotton to the upwardly moving side of said cylinder, a hull board to direct said cotton to a point closely adjacent said cylinder, a knocker roll below said board, a reclaiming cylinder closely adjacent said saw cylinder below the level of said knocker roll, said saw cylinder acting to strip lint from said reclaiming cylinder, a resiliently mounted segment below said reclaiming cylinder, brushes on said segment, said segment being mounted to yield away from said reclaiming cylinder and allow passage of large hulls, and means to remove lint from said saw cylinder.

2. A cotton huller including a housing, a saw cylinder rotatable therein, means to feed seed cotton to the upwardly moving side of said cylinder, a hull board to direct said cotton to a point closely adjacent said cylinder, a knocker roll below said board, a reclaiming cylinder closely adjacent said saw cylinder below the level of said knocker roll, rotating in a direction the opposite from that of said saw cylinder, said saw cylinder acting to strip lint from said reclaiming cylinder, a resiliently mounted segment below said reclaiming cylinder, brushes on said segment mounted to yield with said segment away from said reclaiming cylinder and allow passage of large hulls, and means below said saw cylinder to remove hulls from said reclaiming cylinder.

3. A cotton huller including a housing, a saw cylinder rotatable therein, means to feed seed cotton to the upwardly moving side of said cylinder, a hull board to direct said cotton to a point closely adjacent said cylinder, a knocker roll below said board, a reclaiming cylinder closely adjacent said saw cylinder below the level of said knocker roll, said saw cylinder acting to strip lint from said reclaiming cylinder, a segment spaced slightly below said reclaiming saw cylinder, one end thereof being pivoted and the other end held yieldably toward said reclaiming cylinder, and an adjustable plate secured to the yieldable end of said segment.

4. A housing, a saw cylinder rotatable therein, means to feed seed cotton thereto, a stripper roll above said cylinder, a hull board, a knocker roll below said board, a reclaiming cylinder closely adjacent the lower side of said saw cylinder and adapted to deliver lint thereto, a segmental wall below said reclaiming cylinder, said wall being mounted to yield away from said saw cylinder, a brush on said wall, and a plate hinged to said wall and adjustably supported on said housing.

5. A housing, a saw cylinder rotatable therein, a feeder for seed cotton above said cylinder, means to direct cotton from said feeder to said cylinder, a knocker roll below said means, a reclaiming cylinder rotatable in a direction opposite that of said saw cylinder, a concave segment below said reclaiming cylinder pivoted to said housing at one end, means to limit the movement of the opposite end thereof, means to hold said segment resiliently toward said reclaiming cylinder, and a hull deflecting plate pivotally secured to said segment.

6. A housing, a saw cylinder rotatable therein, a feeder for seed cotton above said cylinder, means to direct cotton from said feeder to said cylinder, a knocker roll below said means, a reclaiming cylinder rotatable in a direction opposite that of said saw cylinder, a concave segment below said reclaiming cylinder pivoted to said housing at one end, means to limit the movement of the opposite end thereof, a spring acting to move said segment toward said reclaiming cylinder and means to deflect the hulls passing said reclaiming cylinder.

7. In a cotton huller, a saw cylinder, a reclaiming cylinder below said saw cylinder, means to deliver cotton to said cylinders, a concave segment resiliently mounted below said reclaiming cylinder and acting to yieldably press the cotton and hulls toward said reclaiming cylinder, a deflecting plate pivotally connected with said segment and an adjustable support for said plate, and means to remove cotton from said saw cylinder.

JOHN A. STREUN.